US008223956B2

United States Patent
Williams et al.

(10) Patent No.: US 8,223,956 B2
(45) Date of Patent: Jul. 17, 2012

(54) SYSTEM AND METHOD FOR MANAGING, DIRECTING, AND QUEUING COMMUNICATION EVENTS

(75) Inventors: Mark J. Williams, North Canton, OH (US); Eric I. Camulli, Copley, OH (US)

(73) Assignee: Virtual Hold Technology, LLC, Akron, OH (US)

( * ) Notice: Subject to any disclaimer, the term of this patent is extended or adjusted under 35 U.S.C. 154(b) by 211 days.

(21) Appl. No.: 12/656,399

(22) Filed: Jan. 28, 2010

(65) Prior Publication Data

US 2010/0189250 A1    Jul. 29, 2010

Related U.S. Application Data

(63) Continuation-in-part of application No. 12/320,516, filed on Jan. 28, 2009, now Pat. No. 8,112,069.

(51) Int. Cl.
*H04M 3/00*    (2006.01)
(52) U.S. Cl. ......... 379/266.01; 379/266.02; 379/266.03; 379/265.11; 379/265.12; 379/265.14
(58) Field of Classification Search .......... 379/265.01–2 65.14, 266.01–266.09
See application file for complete search history.

(56) References Cited

U.S. PATENT DOCUMENTS

| | | | |
|---|---|---|---|
| 5,692,033 A | 11/1997 | Farris | |
| 6,535,601 B1 * | 3/2003 | Flockhart et al. | 379/266.01 |
| 6,879,683 B1 * | 4/2005 | Fain et al. | 379/265.02 |
| 7,068,775 B1 * | 6/2006 | Lee | 379/265.02 |
| 7,426,267 B1 * | 9/2008 | Caseau | 379/265.02 |
| 2002/0065759 A1 | 5/2002 | Boies et al. | |
| 2002/0193119 A1 | 12/2002 | Goss et al. | |
| 2003/0093167 A1 | 5/2003 | Sim | |
| 2003/0133558 A1 | 7/2003 | Kung et al. | |
| 2003/0195753 A1 * | 10/2003 | Homuth | 705/1 |
| 2003/0235287 A1 | 12/2003 | Margolis | |

(Continued)

FOREIGN PATENT DOCUMENTS

KR    10-2003-00569994    7/2003

(Continued)

OTHER PUBLICATIONS

International Search Report issued Sep. 18, 2010, in related foreign application under the WIPO, Application No. PCT/US2010/000238.

(Continued)

*Primary Examiner* — Joseph J Nguyen
(74) *Attorney, Agent, or Firm* — Andrews Kurth LLP; Aldo Noto

(57) ABSTRACT

A queue interface system and method for queuing voice calls for use with a communication system having queues includes a queue selector allowing a user to select a queue from a list of queues on a display. In an embodiment, one or more of the queues on the list of queues is a service agent queue. Further, the queue interface system includes an expected wait time component for displaying an expected wait time for a customer for the selected queue. The system also includes a call options selector providing a hold option and a call option. The hold option places a call in the selected queue and the call option causes a call to occur. In an embodiment, the call option further includes assigning a placeholder for a customer in the selected queue and causing a call to the customer to occur after the expected wait time.

25 Claims, 12 Drawing Sheets

U.S. PATENT DOCUMENTS

| | | | |
|---|---|---|---|
| 2005/0175167 A1* | 8/2005 | Yacoub et al. | 379/265.13 |
| 2006/0012810 A1 | 1/2006 | Postle et al. | |
| 2006/0182243 A1 | 8/2006 | Yun | |
| 2007/0160076 A1 | 7/2007 | Faber et al. | |
| 2007/0274495 A1 | 11/2007 | Youd et al. | |
| 2008/0063180 A1 | 3/2008 | Barsness et al. | |

FOREIGN PATENT DOCUMENTS

| | | |
|---|---|---|
| KR | 10-2004-0104097 A | 12/2004 |
| KR | 10-0612440 B1 | 8/2006 |
| KR | 10-07659967 | 10/2007 |
| WO | WO2004-081720 | 9/2004 |

OTHER PUBLICATIONS

International Search Report issued Oct. 12, 2010, in related foreign application under the WIPO, Application No. PCT/US2010/000239.

* cited by examiner

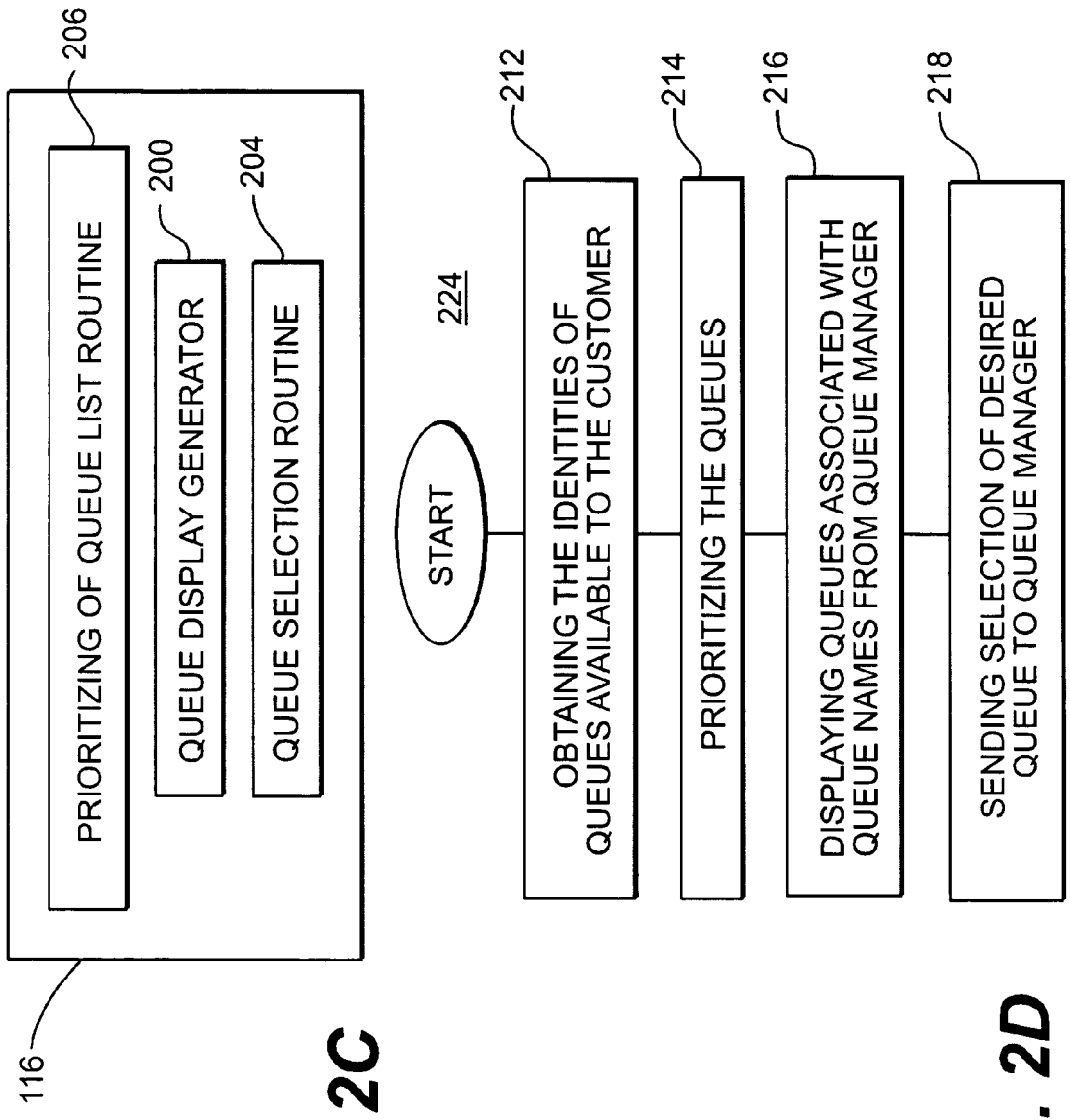

FIG. 5B

DECEMBER 2008

| S | M | T | W | T | F | S |
|---|---|---|---|---|---|---|
|   | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 |   |   |   |

JANUARY 2009

| S | M | T | W | T | F | S |
|---|---|---|---|---|---|---|
|   |   |   |   | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 28 | 28 | 29 | 30 | 31 |

DECEMBER 2008 — 544

ALTERNATE DATE/TIME:
12/12/2008  16:30:00 P.M. EST
12/12/2008  16:45:00 P.M. EST
12/12/2008  17:00:00 P.M. EST
12/12/2008  17:15:00 P.M. EST
— 560

DATE  FRIDAY, DECEMBER 12, 2008 — 548
TIME  16:15:00 P.M. EST — 552
PHONE  330-670-2200 — 556

SUBMIT — 564
CANCEL — 568
CANCEL CALL-BACK — 576

APPOINTMENT CALL-BACK CONTINUED
12/12/2008, 4:15 P.M. EST — 572

550

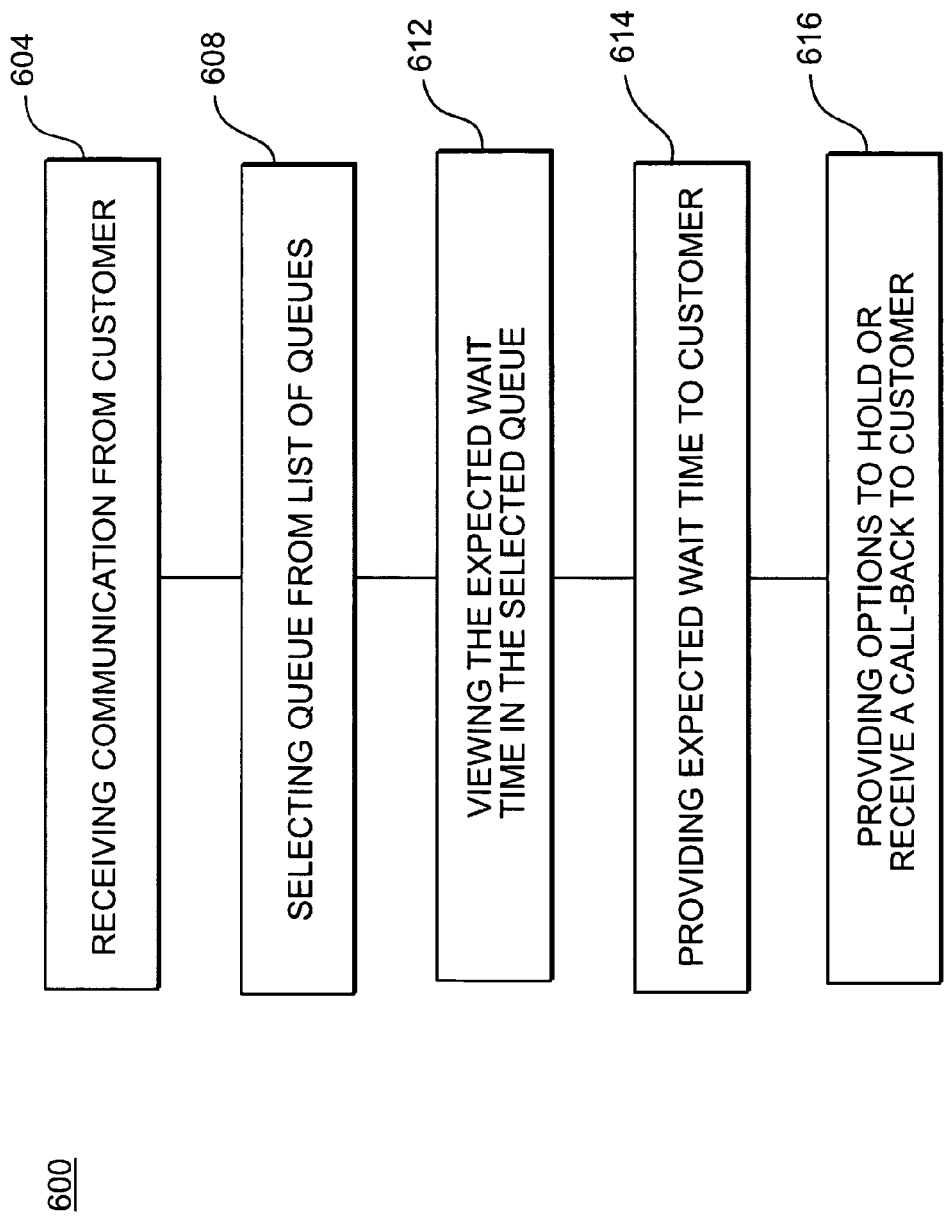

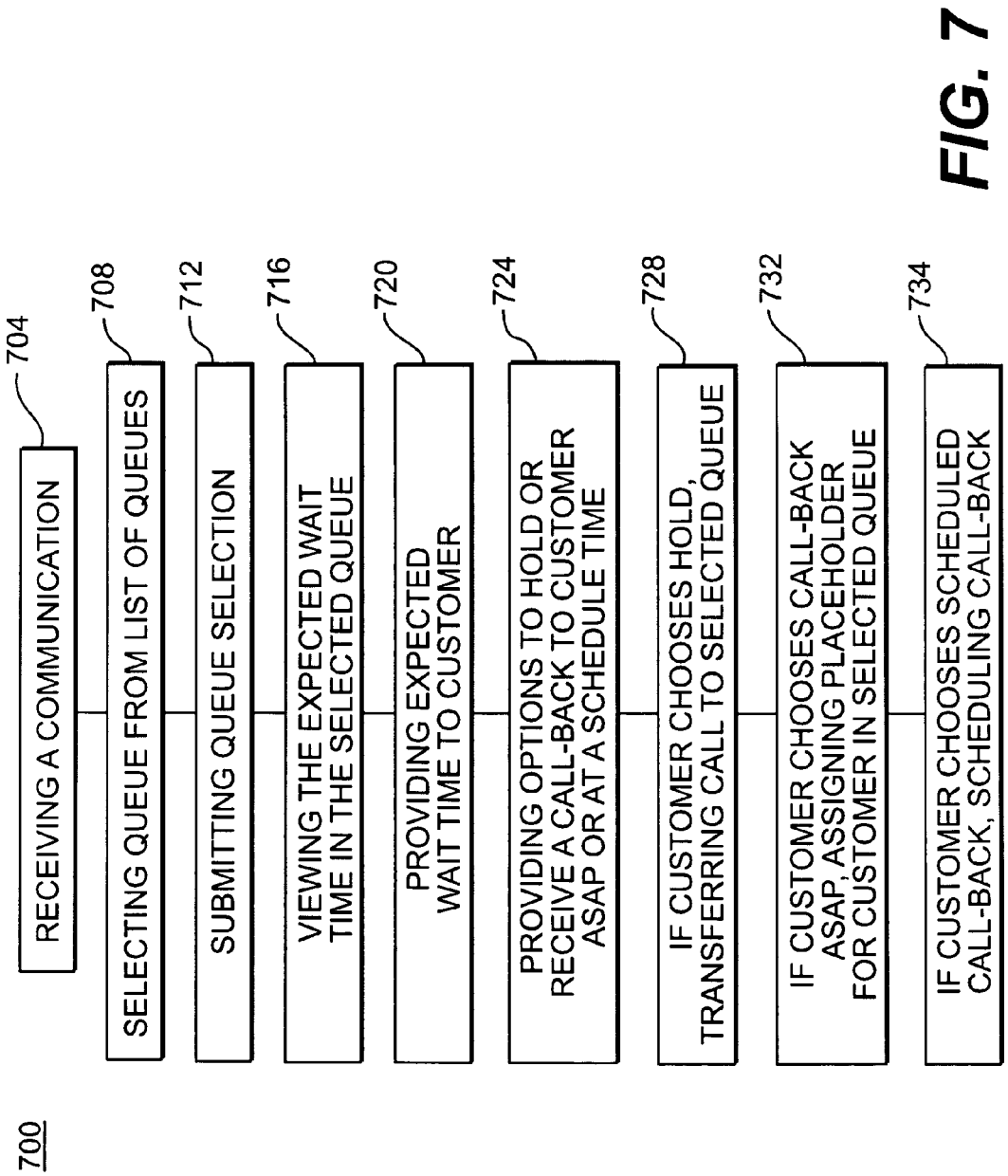

SYSTEM AND METHOD FOR MANAGING, DIRECTING, AND QUEUING COMMUNICATION EVENTS

RELATED APPLICATIONS

This application is a continuation-in-part of U.S. patent application Ser. No. 12/320,516, filed Jan. 28, 2009 entitled SYSTEM AND METHOD FOR ESTABLISHING AUTOMATED CALL BACK USING A MOBILE COMMUNICATION DEVICE, which is hereby incorporated by reference.

TECHNICAL FIELD

The systems and methods relate to directing and managing the queuing of communications including customers waiting to be connected by telephone to a service agent or resource of a business communication center.

BACKGROUND

Many businesses use groups of service representatives or service agents to answer client telephone calls and communicate information. To most efficiently use the time and skills of each service representative, the service representatives may be organized into groups based on a skill set. For example, the groupings may be based on the representatives ability to handle client issues such as the opening of new accounts, billing issues and customer service issues on existing accounts.

Companies may use automatic call directors (ACDs) to handle calls. ACDs are manufactured by Lucent, Siemens and Nortel. For an example of an ACD with queues see U.S. Pat. No. 5,335,269.

Typically, if a service agent can not service a client telephone call, the client is put on hold while the call is transferred to a queue for the appropriate service agent, in another skill group, capable of handling the call. Requiring a service agent to transfer every call to the appropriate service agent is not cost efficient. Transferring calls is not cost efficient for a business such as a contact center because contact centers are charged fees for transferring calls.

Another disadvantage of existing communications systems, such as contact centers, is customer exacerbation due to waiting on hold. In an effort to reduce customer exacerbation caused by having to maintain a connection while on-hold in queue, secondary queue systems have been developed. A typical secondary queue system obtains a telephone number at which the calling client can be reached when a service representative is available (i.e., a call back number). The client disconnects, and then, at the proper time, a call back system establishes a connection to the client utilizing the call back number and couples the client to an available representative without waiting on-hold in queue. One exemplary system is disclosed in U.S. Pat. No. 6,563,921 to Williams et al. which is commonly assigned with the present application.

While such a system may make the experience of waiting for a connection to a service representative slightly less exacerbating, it does not address the inconvenience of having to navigate an irritatingly slow and usually complicated voice prompt menu to enter the queue.

Accordingly, a method and system for handling calls to a resource in a more efficient and convenient manner is needed.

Also, improvements are needed in directing and managing the queuing of communications. Improvements are needed in interfaces for displaying queuing information and making queue selections.

SUMMARY

Systems and methods to interface with and manage queuing for use with a communication system are described. The described systems for handling communications enable an individual or system receiving a communication to direct the communication to another individual or system. More particularly, the communication directing systems allow a recipient, such as a customer service representative or service agent, to direct an incoming communication from a customer to another representative or agent. The individual receiving the communication may wish to direct or transfer the incoming communication or call for a number of reasons for example, the customer may be attempting to obtain information that is not readily available to the communication recipient.

Often, when directing a telephone call, a call recipient will transfer the call without further action. However, a directing system, allows the call recipient to provide options to the caller for directing the call. The call directing system allows the call recipient to view a list of places or queues to transfer the call. The displayed list of queues available may be prioritized based on caller information. The call directing system also allows the call recipient to view the expected wait time for each queue. Finally, the customer may be given the option to hold or to choose when to receive a call-back, either after the expected queue wait time or at a scheduled date and time. The call recipient may be an automated system, such recipient may direct the incoming call.

The systems and methods described may receive in-coming communications of various types including voice telephone calls, text messages, e-mails, internet and other electronic communications.

In one embodiment a queue interface system for queuing voice calls for use with a communication system having queues includes a queue selector selecting a queue from a list of queues on a display, wherein one or more of the queues on the list of queues is a service agent queue. The system further includes an expected wait time component displaying an expected wait time of a customer for the selected queue and a call options selector. The call options selector includes a hold option or a call option for directing a call, wherein the hold option places a call in the selected queue and the call option causes a telephone call to occur. The call occurrence is typically based on a queue or a scheduled call-back date and time.

In another embodiment, a method for queuing voice calls for use with a communication system having a service agent, a display and queues includes receiving a call from a customer and selecting, using information received from the customer, a queue from a list of queues displayed on the interface, wherein the selected queue is a service agent queue. The method further includes viewing an expected wait time for the selected queue displayed on the interface and providing to the customer the expected wait time in the selected queue. The method includes providing to the customer a choice of one of a hold option or a call option, wherein the hold option transfers the customer to the selected queue and the call option causes a call. Various call options are available.

In another embodiment, a computer-readable medium embodying instructions executable by a computer queuing voice calls for use with a communication system having queues includes a queue selector for generating a list of queues. The queue selector is a service agent queue and a service agent selects, from the information given by a customer, a desired queue from a list of queues displayed on the interface. The computer-readable medium further includes an expected wait time component to indicate an expected wait time for the selected queue and a call options selector. The call options selector provides a choice of a hold option or a call option for selection. The hold option includes transferring a call to the selected queue and the call option includes assigning a placeholder for the customer in the selected queue.

The displayed list of queues may be prioritized using a prioritization routine that scores and weighs data about customers.

BRIEF DESCRIPTION OF THE DRAWINGS

FIG. 2C is a block diagram representing an exemplary queue selector component with an exemplary prioritization of queue list routine.

FIG. 2D is a flow-chart of another exemplary operation of a queue selection method in accordance with an exemplary embodiment.

FIG. 5B represents an exemplary graphical user interface showing the scheduling component.

FIG. 6 a flow chart of an exemplary method for interfacing with queues for use with a communication system.

FIG. 7 is a flow chart of another exemplary method for interfacing with queues for use with a communication system.

DETAILED DESCRIPTION

Figure 1A:
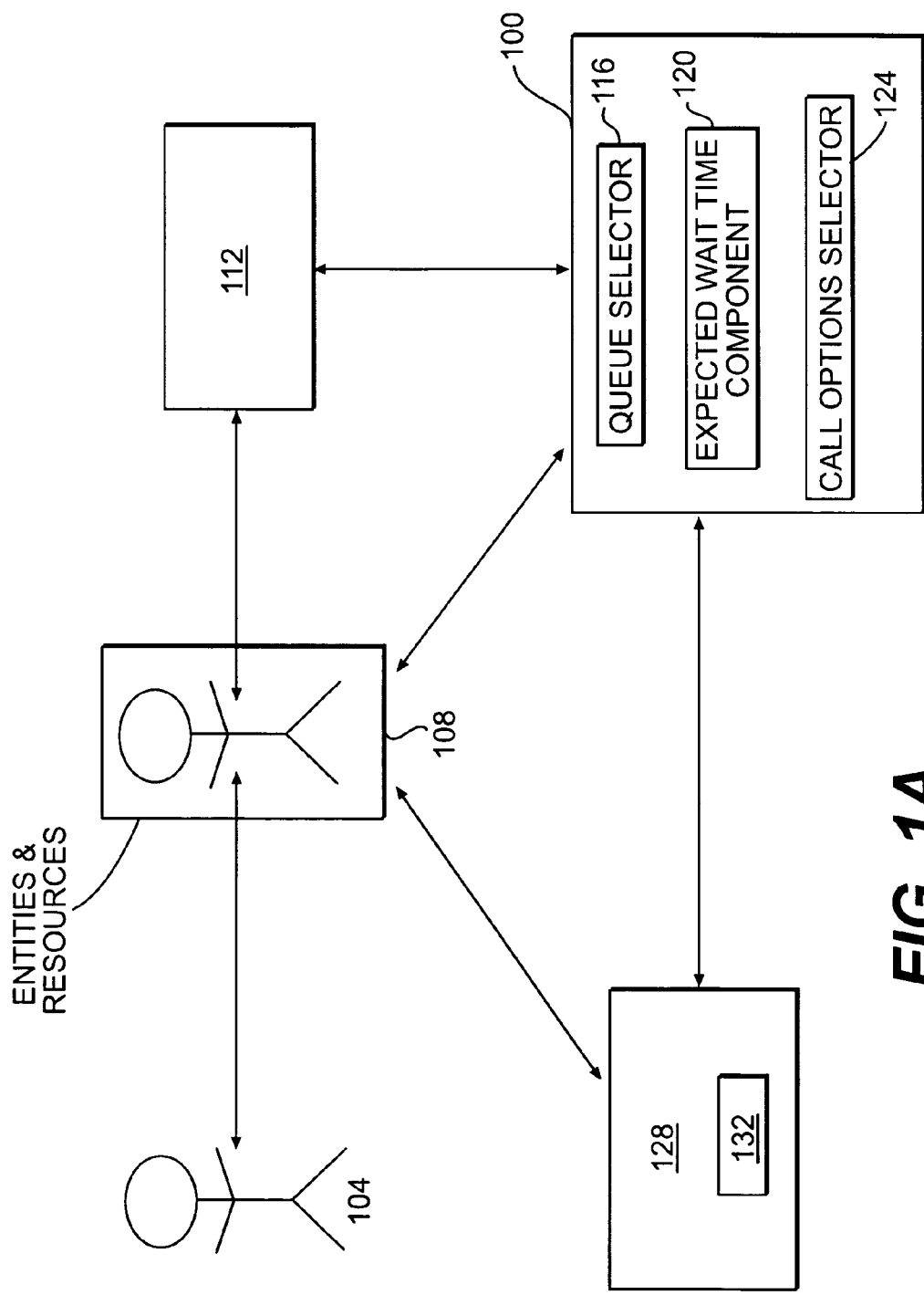
FIG. 1A is a schematic diagram representing an exemplary architecture of a system for interfacing and managing queues for use with a communication system.

Referring now to FIG. 1A, a schematic diagram representing an exemplary architecture of a system 100 to interface with and manage queuing for use with a communication system, such as a call system 128, is illustrated. FIG. 1A shows a customer 104 or caller, a call recipient, service agent, computerized or other resource 108, a web server 112, a system for directing a call 100, a call system 128 and a queue manager 132. The customer may initiate a telephone call or other type of communication such as an electronic communication with text. The system 100 for directing a communication, or by shorter name, directing system 100, includes a queue selector 116, expected wait time component 120, and call options selector 124. The call system 128 includes the queue manager 132 that receives and sends data to directing system 100. In one embodiment, the resource 108 is a call recipient or service agent that accesses and uses the directing system 100. While the term service agent will generally be used, it is understood that the service agent could be any representative, receptionist, user or individual. The resource 108 may access the directing system 100 in various ways both directly and indirectly. Some methods of accessing the directing system 100 a resource or an agent 108 include for example direct local access, internet access through a web server 112, and through the call system 128. In an embodiment, the directing system 100 is accessible by the resource only through the internet as the directing system 100 resides on the web server 112 (shown in FIG. 1B). In an embodiment where the directing system 100 is accessible through the call system 128, the directing system 100 is locally connected to the call system 128 and communicates directly with the call system 128. In another embodiment, the directing system 100 may communicate with the call system 128 through the internet. Various other configurations to connect a resource 108 such as a service agent to directing system 100 are possible.

The queue manager 132 manages and houses the list of queues for telephone calls waiting to be connected to a group or category of customer service representatives or service agents (not shown). The queue manager 132 further includes queues for holding placeholders for customers requesting a call-back after an expected wait time or at a chosen date and time. The queue manager 132 interfaces with ACDs or other computerized mechanisms to receive events. The received events indicate state changes for calls, segmented by call type, and are processed by the queue manager 132 and placed into an array in order to calculate the expected wait time for a customer requesting service from a group of service agents 108. The arrays the queue manager 132 uses are not shown.

In an embodiment, the queue selector 116 enables a resource 108 such as a service agent to select a queue from a list of queues displayed on a display. The display for the list of queues may be a computer monitor or other display device. The display may be part of a service agent workstation (shown in FIG. 1B).

The queues displayed in the list may be a queue for any individual accepting calls. In one embodiment, one or more of the queues on the list of queues is a service agent queue (not shown). A service agent queue is a queue for telephone customers waiting to be assisted by a service agent. A service agent queue is stored in a call system 128 and is managed by a queue manager 132, which resides within a call system 128. The service agent queues may be stored on a server (not shown) within the call system 128.

In an embodiment, the expected wait time component 120 obtains or fetches the expected wait time for a selected queue and displays the wait time. More specifically, for a selected queue, the expected wait time component 120 fetches the expected wait time from the queue manager 132 and displays the current expected wait time for a customer 104 or caller to connect with a service agent 108 associated with the selected queue.

The call option selector 124 allows for the selection of one or more options for directing an incoming communication. In one embodiment, the call options selector 124 includes a hold option and a call or call-back option for directing a communication. The hold option places a call in a selected queue to wait, while the call or call-back option causes a telephone call to occur. In one embodiment, the call option includes two variations. The first provides the resource 108 with the ability to enter a placeholder in a selected queue so that the customer receives a call after a wait time in the selected queue has passed. The second call option variation allows the resource 108 to schedule a call with a customer at a date and time chosen by the customer. While the resource 108 is often described as a person, computerized or automated communication equipment may be used. The resource 108 communicates with the customer by voice, sound or electric communications, for example text, messaging, emails or internet.

Figure 1B:
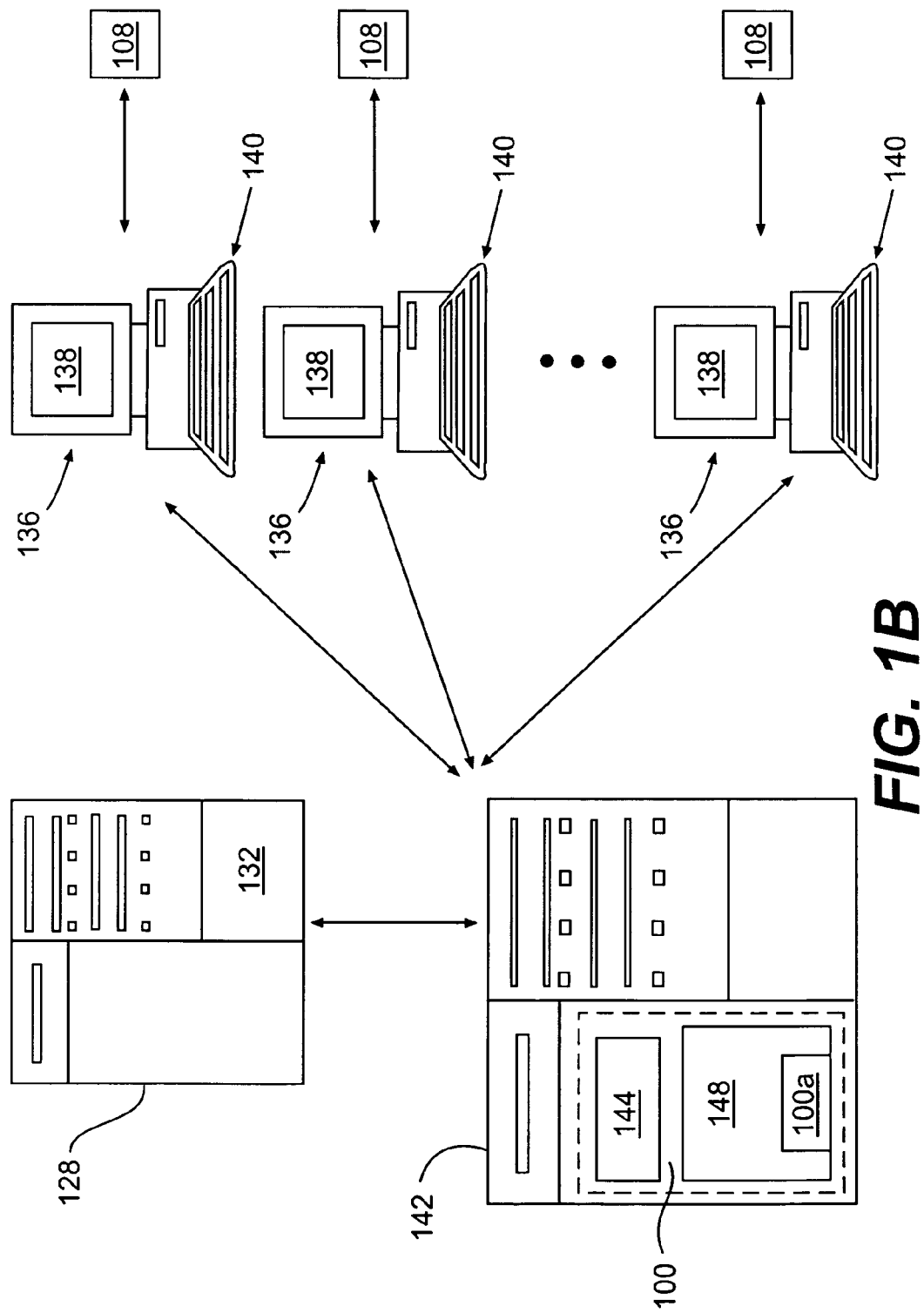
FIG. 1B is a block diagram representing an exemplary architecture of a system for interfacing and managing queues stored in a server for use with a communication system.

Referring to FIG. 1B, a diagram representing an exemplary architecture of a call center implementation is shown. In this embodiment, the directing system 100 is stored in a server 142 that works with a call system 128. An embodiment of the server 142 may include a processor 144 and memory 148. The directing system 100 and software application 100a is shown stored on memory 148 and implemented by a processor 144. The directing system 100 may be made up of a processor 144 and a memory 148 with stored program 100a. Any number of resources including service agents 108, three are shown in FIG. 1B, may use service agent workstations 136 to access the directing system 100 through a server 142 using input/output paths connecting the server and service agent workstations 136. A service agent workstation 136 typically includes a display device 138, an input device 140, processor and memory (not shown). The display device may comprise a display terminal and an input device may comprise a keyboard and or mouse, for example. The directing system 100 may also include various elements not shown in FIG. 1B such as disk drives, additional keyboards, additional input/output paths, network connections, memory, and processors. In some embodiments, voice activation or input is used.

In one embodiment, the customer provides an electronic text message to the queue interface and management system called directing system 100, The system 100 interprets the communication and uses the queue selector 116, expected wait component 120 and call option selector 124 to offer displays to the customer or an individual. Based on selections made from displays, the customer is placed in queue.

Figure 2A:
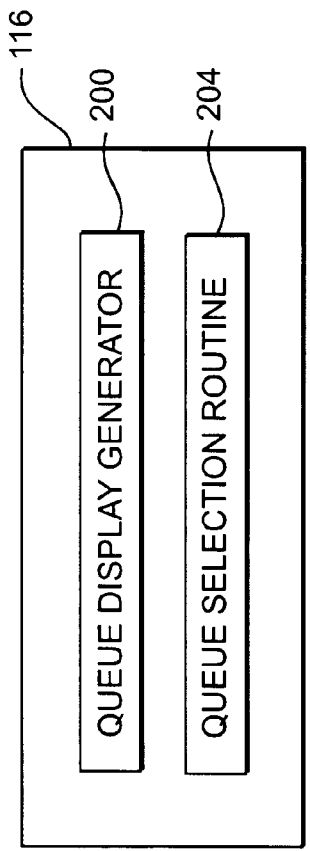
FIG. 2A is a block diagram representing an exemplary queue selector component.

Referring to FIG. 2A, a block diagram representing an exemplary queue selector 116 is shown. The queue selector 116 includes a queue display generator 200 and a queue selection routine 204. The queue display generator 200 generates, for display, a list of queues corresponding to queues in a queue manager 132. The queue selection routine 204 allows for the selection of a queue from a list of queues.

The queue display generator 200 obtains the identities of the available queues from the queue manager 132. The queue display generator 200 then uses these identities to generate a visual display for a user, such as a service agent 108, to see some or all the queue choices. Any number of display formats can be used for the display of queues including a pull down list or a display of icons.

In an embodiment, a display of the queues is generated at the customer location for the customer to review. The queue display generator 200, a queue display generator at the customer's location (not shown), or both may be used to generate a queue list display for a customer. The customer may use a mobile telephone, mobile device, or any other device with a display to view the queue list. In one embodiment, the customer alone may view the queue list. In another, the customer or customer may, simultaneous with an agent, view the identities of the queues by generating a visual display of available queues on the customer's display or screen while in communication with the agent.

The queue selection routine 204, permits a selection to be made from the generated list. The queue selection routine 204 also sends an indication of the selected queue to the queue manager 132. The indication of the selected queue may be in the form of a web service request transaction to the queue manager 132, for example.

Figure 2B:
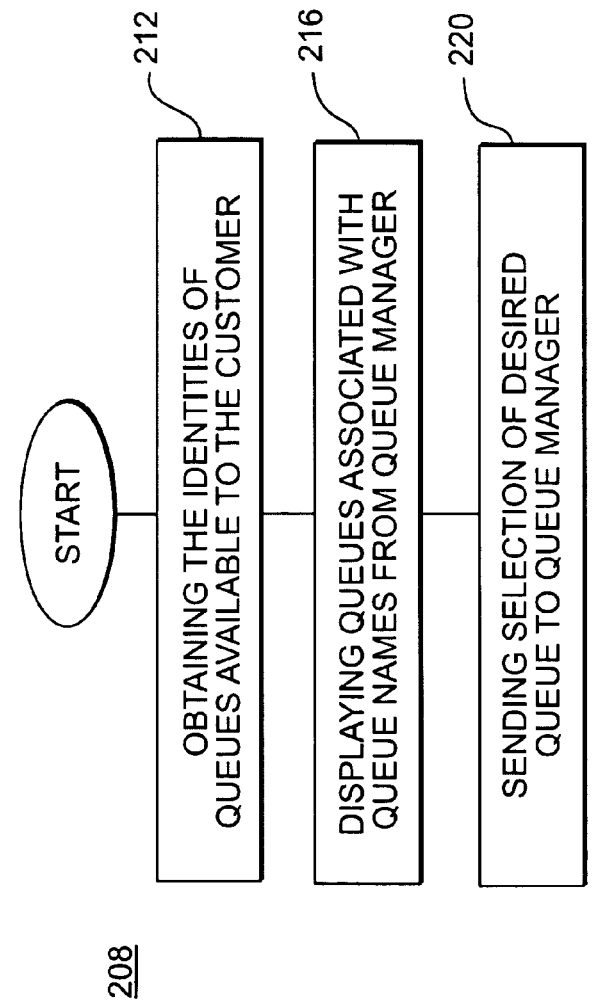
FIG. 2B is a flow-chart of the exemplary operation of a queue selection method in accordance with an exemplary embodiment.

Referring now to FIG. 2B, a flow-chart of the exemplary operation of a queue selection method 208 is shown. The method includes obtaining the identities of the queues that are available to a customer 212, displaying a list of queues corresponding to queues in a queue manager 216, and sending the selection of a desired queue to the queue manager 220.

The step of obtaining the identities 212 may be by calling and fetching from the queue manager or simply by using a look-up table.

In an embodiment, a service agent 108 selects the desired queue based on information received from the customer. For example, if the customer needed information on investments, the service agent can select the queue that corresponds with investments from the list of queues.

Referring now to FIG. 2C, a block diagram of an embodiment of the queue selector 116 is shown. In this embodiment, the queue selector 116 includes a prioritization of queue list routine 206, queue display generator 200 and a queue selection routine 204.

The prioritization of queue list routine 206 prioritizes the queues in the list of queues before generating a visual display of the queues for the user. The list of queues is prioritized according to data associated with a customer. The data may include the customer's purchase history, geographic location, the end result of previous calls and details contained within the current call as noted by the service agent 108 (who is recording an account of the interaction in the system 100). For example, the list may prioritize and display the name of a queue at the top of the queue list whose service agents 108 are familiar with the geographic location of the customer in order to better serve the customer.

Referring to FIG. 2D, a flow-chart of an exemplary operation of a queue selection method 224 is shown. The method includes obtaining the identities of the queues that are available to the customer 212, prioritizing the queues 214, displaying a list of queues corresponding to queues in a queue manager 216, and sending the selection of a desired queue to the queue manager 218.

The list of queues is automatically generated by the queue display generator 200 and is prioritized according to data associated with a customer. In one embodiment a prioritization of queue list routine 206 is used. The prioritization routine assigns a priority to queues based upon a scoring of data related to the call or customer. In sum, data elements related to a customer or caller record are scored and weighted and used to prioritize queue lists. A number of different priority routines may be used. Prioritization of queue list routines 206 may be used to generate the customer's queue list, to generate the user's queue list or both. The prioritization of queue list routines 206 may be located in various locations including at the customer location, for example on the customer's mobile device.

Figure 2E:
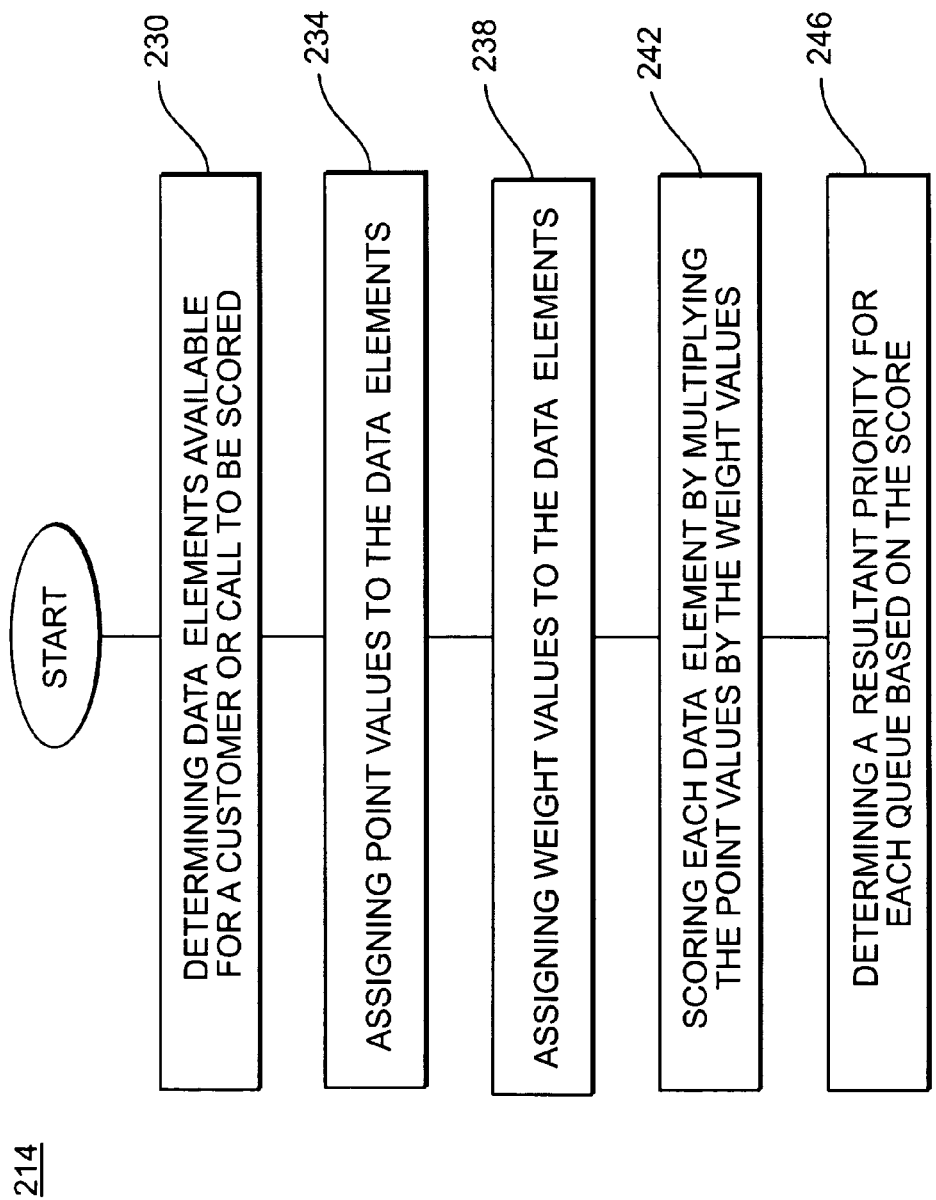
FIG. 2E is a flow-chart of an example method for prioritization of a queue list.

Referring to FIG. 2E, a flow-chart of an exemplary operation of a prioritization of queue list method 214 performed by the prioritization of queue list routine 206 is shown. The exemplary method 214 includes determining the data available for a customer or call to be scored 230. An additional optional step of choosing a set of data elements from among the available data elements may be used. For each data element available or desired to be scored, the exemplary prioritization method includes assigning a point value to the data element 234, and assigning weight values to the data elements 238. The method 214 further includes scoring each desired or available data element by multiplying the weight values by the point values to determine a score 242. In addition, the method 214 further includes determining a resultant priority for each relevant queue using the scores 246.

The prioritization of queue list routine 206 determines the data available for a customer or call to be scored 230. The data may include data elements of a customer record or customer call record that was previously collected from the customer during another call. Some examples of data elements related to a customer are purchase history, age, net worth, sex, occupation, and geographic location.

Further, the prioritization of queue list routine 206 assigns a point value to the data element 234. The service agent 108 may assign a point value for a data element or the values may be assigned automatically by a computer, for example.

In one embodiment, the prioritization of queue list routine 206 scores the data elements according to an assigned point value 242. A number is assigned in advance for each type of data element. The number may be between 0 and 3, for example. A weight value is also assigned in advance to the data elements 238. The weights of the data elements are determined by the owners of the system according to their policies. A weight value may be between 0 and 1, for example To arrive at a score, the prioritization of queue list routine 206 multiplies the weights by the points assigned. In an embodiment, the score will be associated with a list of possible queues by the system owner.

The prioritization of queue list routine 206 determines a resultant priority for each relevant queue using the scores 246. For determining the resultant priority, the prioritization of queue list routine 206 maps scored data elements to certain queues in various ways. One way to map scored data elements to particular queues is for data elements to be grouped by category. The categories are mapped to one or more queues. For example, data elements such as service down, outages and errors are mapped to the maintenance queue. Billing, credit and invoicing may be mapped to accounting or accounts receivables; and service request and new installation may be mapped to sales etc. The queue with the highest accumulated score is first on the priority list followed by the queue with the next highest accumulated score. In the case where there is a tie amongst queue scores or no score for a particular queue, a default preference or priority may be used in conjunction with the accumulated score to complete the priority list.

Figure 3A:
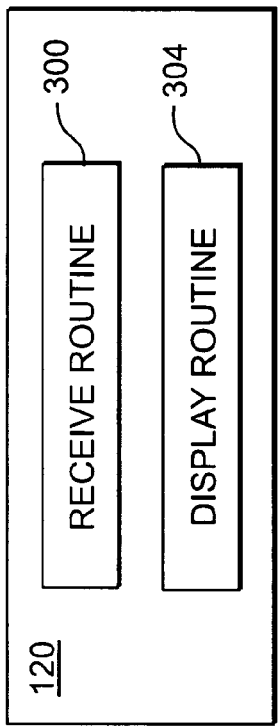
FIG. 3A is a block diagram of an exemplary expected wait time component.

Referring to FIG. 3A, a block diagram of an exemplary expected wait time component 120 is shown. The expected wait time component 120 includes a receive routine 300 that receives the expected wait time for the selected queue from the queue manager 132. The queue manager 132 sends the expected wait time for the selected queue upon receipt of a web service request transaction, for example, from the queue selector 116 indicating the selected queue. The expected wait time information can be received in various formats and through various computer communication paths. The expected wait time component 120 further includes a display routine 304 that generates a display of an expected wait time of a customer in a selected queue. The display routine 304 uses the received expected wait time information to generate the display. Through this display the call recipient learns of the expected wait time. An audio of the expected wait time may be used in conjunction with the display or in the alternative.

Figure 3B:
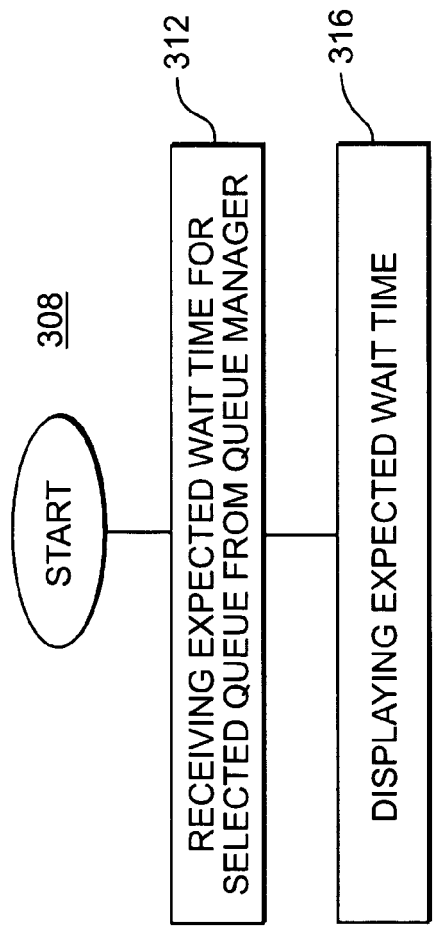
FIG. 3B is a flow-chart of the exemplary operation of a queue selection method.

Referring to FIG. 3B, a flow-chart of the exemplary operation of an expected wait time method 308 is shown. The method 308 includes receiving the expected wait time for the selected queue 312 from a queue manager 132. The queue manager 132 sends the expected wait time for the selected queue to the expected wait time component 120 upon receipt of a web service request transaction. For example, the web service request may arrive from the queue selector 116 indicating the selected queue. Further, the method 308 includes steps for causing the expected wait time of a customer for the selected queue 316 to be displayed. Alternatively, the expected wait time may be provided through audio for call recipient and customer.

Figure 4A:
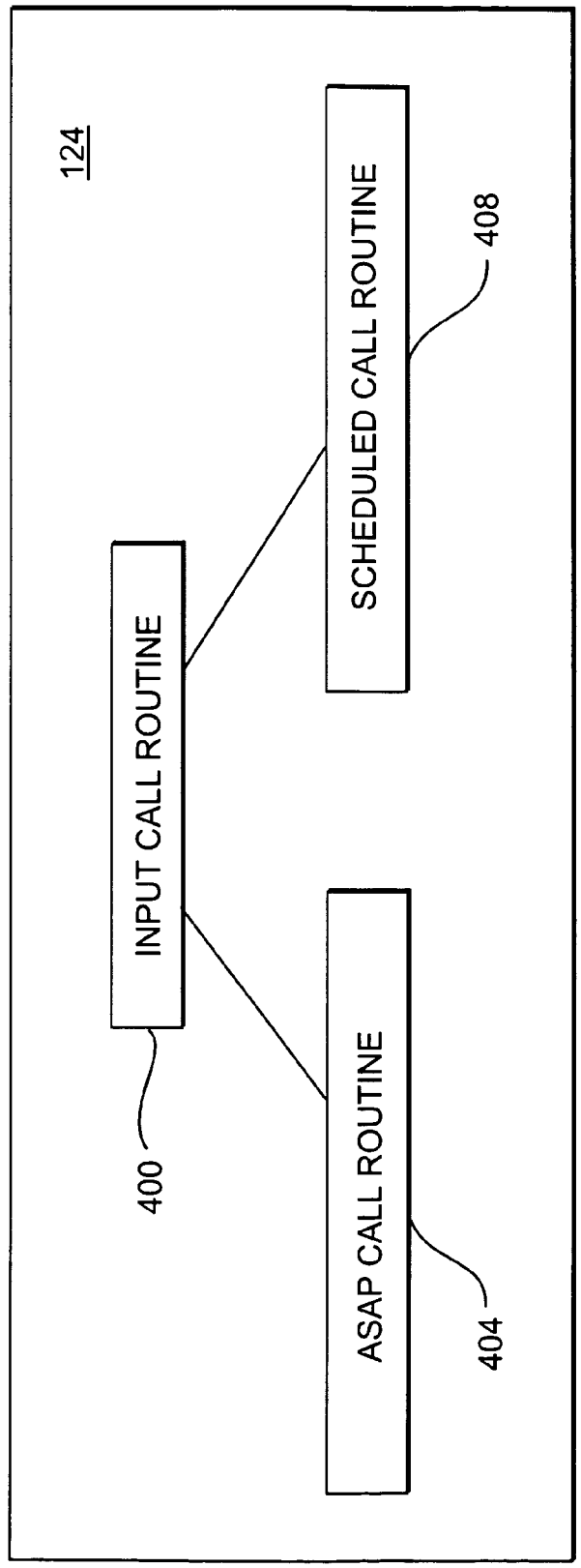
FIG. 4A is a block diagram of an exemplary call options selector.

Referring now to FIG. 4A, a block diagram of an exemplary call options selector 124 is shown. In one embodiment, the call options selector 124 includes four components, an input routine 400, an ASAP call routine 404, and a scheduled call routine 408.

The input routine 400 receives input from a service agent 108. Specifically, the input routine 400 receives a selected option for directing a call from a service agent 108. There are two call routines for the service agent 108 to choose, the ASAP call routine 404 and the scheduled call routine 408.

The ASAP call routine 404 assigns a placeholder for the customer in the selected queue and places a call to the customer after a wait time based upon the assigned placeholder in the queue. In the ASAP call routine 404, the queue manager 132 assigns a placeholder for the customer in the selected queue and monitors the placeholder's position in the queue. When the customer's placeholder in the queue reaches a position in the queue to receive a call-back, the queue manager arranges a call-back by notifying the appropriate component, such as an IVR (not shown), which may be connected to system 100 through a network.

The scheduled call routine 408 schedules a call to a customer at a date and time chosen by the customer. The scheduled call routine 408 receives input from a customer 104 or caller through the service agent 108 including the time and date for a call. In an embodiment, the scheduled call routine 408 sends a web services transaction request to the queue manager 132 for the queue manager to assign a placeholder for the customer or caller in the selected queue. When the customer's selected time and date to receive a call arrives, the queue manager arranges a call by notifying the appropriate component, such as an IVR (not shown), which may be connected to system 100 through a network.

Figure 4B:
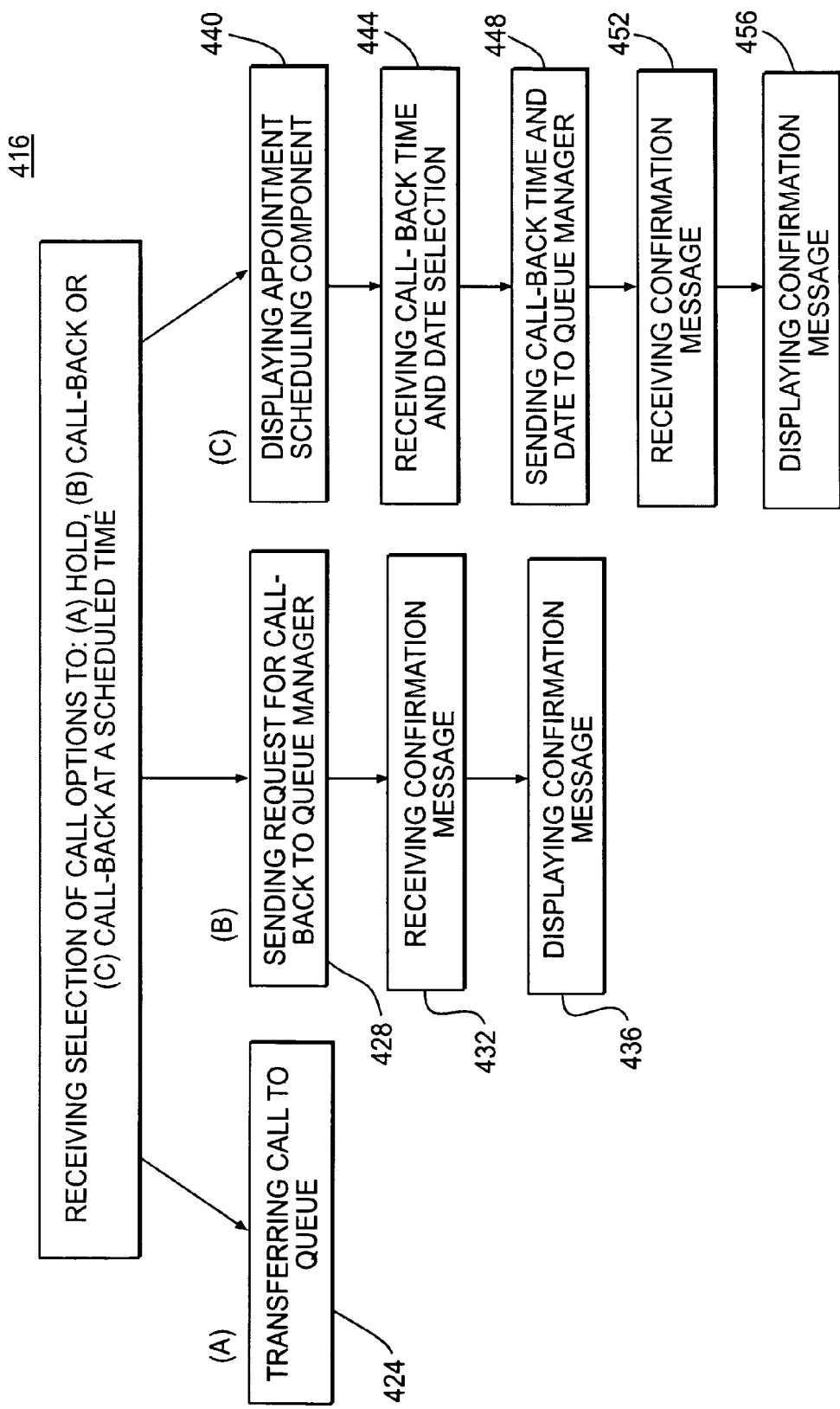
FIG. 4B is a flow-chart of the exemplary operation of a call options selection method.

Referring now to FIG. 4B, shown is a flow-chart of the exemplary operation of a call options selection method 416. At this point of the overall communication handling process, the customer has typically selected a queue. The method 416 includes receiving, typically from a service agent 108, a selection of a call option to (A) hold, (B) call-back or (C) call at a scheduled time 420.

The hold call option shown as (A) includes transferring a call to a selected queue 424. The service agent 108 or agent can use the system to direct a call to a specific queue. The directing system interacts with the call system and allows for a telephone call to be placed directly into an existing queue. The customer remains on "hold" until the placeholder for his call reaches the top of the queue.

The call option shown as (B) includes sending a request for an as soon as possible call-back to a queue manager 428, receiving a confirmation message from the queue manager 432, and displaying the confirmation message 436. The confirmation message serves as a confirmation that the call has been scheduled. The queue manager 132 assigns a placeholder to the customer or caller and places the placeholder in the appropriate queue. In one embodiment, the call is initiated when the placeholder reaches the top of the queue. In another embodiment the call occurs after an expected wait time. The wait time is calculated based upon a placeholder location or by other methods. In yet another embodiment, the call may be initiated prior to the placeholder reaching the top of the queue, for example, when it is the next placeholder to reach the top of the queue, or second from the top of the queue. As described above, the queue manager 132 assigns a placeholder for the customer or caller in the selected queue and monitors the placeholder's position in the queue. When the customer's placeholder in the queue reaches a position in the queue position to receive a call, the queue manager arranges or causes a call by notifying an interactive voice response (IVR) component to place the call (not shown), which may be connected to system 100 through a network.

The call-back at a scheduled time (C) call option includes five steps, the displaying a scheduling component step 440, the receiving a call-back time and date selection step 444, the sending the call-back time and date selection to a queue manager step 448, the receiving a confirmation message step 452, and displaying the confirmation message step 456.

The displaying appointment scheduling component 440 step includes using a software routine to display a menu of queue names corresponding to queues. The queues correspond to service agents 108. The displaying appointment scheduling component 440 step also uses a software routine to display various other fields and buttons to aid in scheduling a call-back at an appointed time.

The receiving a call-back time and date selection 444 step receives a desired date and time for a call as input from a customer after the scheduling component is displayed.

The sending the call-back time and date selection to a queue manager 448 step includes sending the customer's selected time and date to the queue manager 132 to be added to the queue. The queue manager 132 assigns a placeholder to the customer and places the placeholder in the selected queue.

The receiving a confirmation message 452 from the queue manager 132 step receives a message from the queue manager 132 confirming that a call has been scheduled. The messaging occurs through web services messaging systems such as by using XML over Simple Object Access Protocol (SOAP).

The displaying the confirmation message 456 generates a message and causes the message to be displayed on a screen. The confirmation message serves as a confirmation that the call at a certain time and date has been scheduled.

Figure 5A:
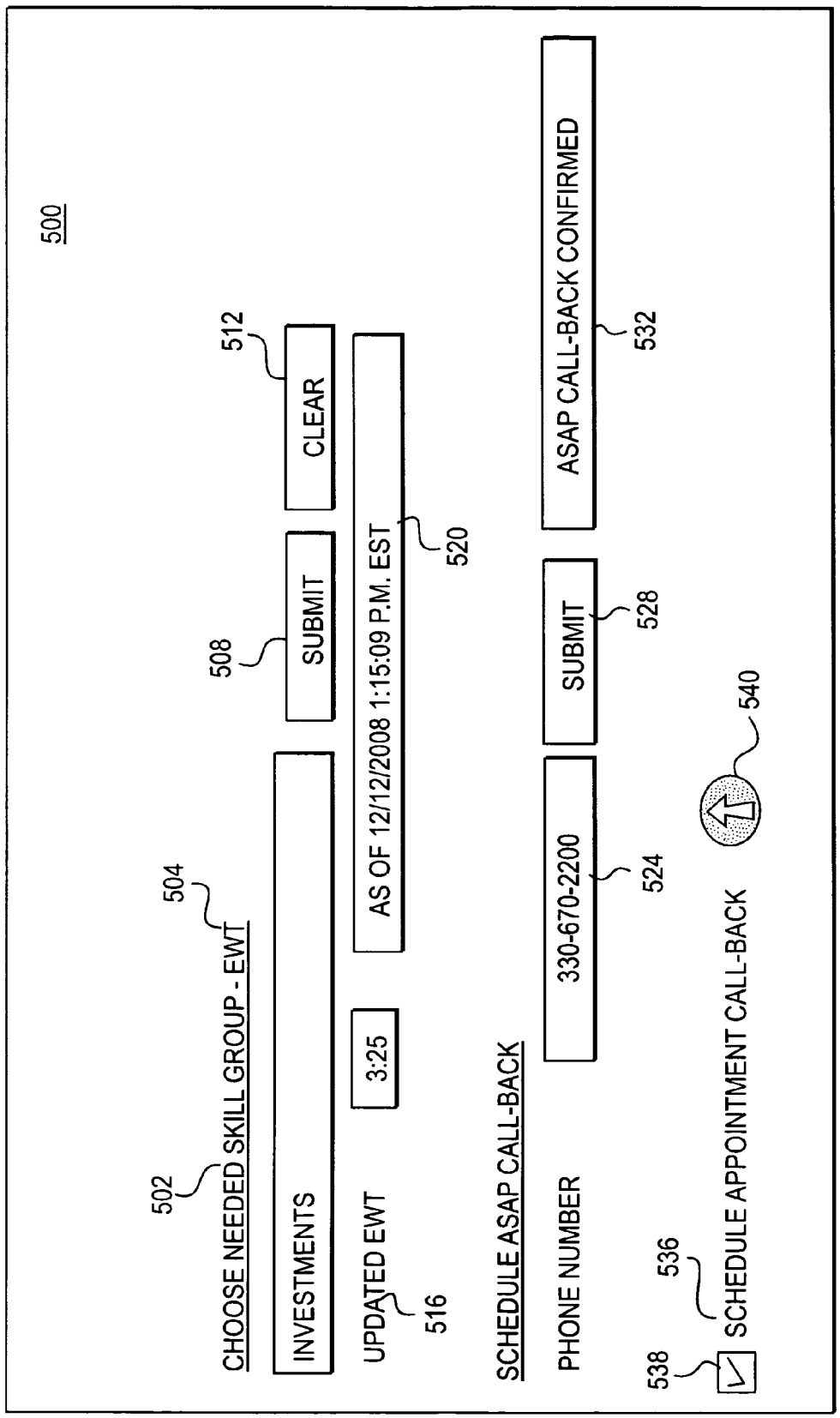
FIG. 5A represents an exemplary graphical user interface for use with an embodiment of the system for interfacing and managing queues for use with a call system.

Referring now to FIG. 5A, shown is an exemplary graphical user interface for use with an embodiment of the queue interface system for directing a call for use with a call system. The screen 500 shown in FIG. 5A can be segmented into four portions (1) the choosing a skill group or queue 502, (2) Expected Wait Time (EWT) 516, (3) ASAP Callback section 524 and (4) Schedule Appointment Callback 536. Each of these segments or portions can be placed on a single screen as shown or re-orientated into multiple screens.

The first portion of the screen choosing a skill group or queue 502 is for displaying a list of skills or queues available to a user, or service agent 108, for example. In an embodiment, the choosing a skill group or queue portion 502 includes a dropdown list 504 for displaying the list of queues available to the service agent 108. The dropdown list 504 is populated with the list of queue names from the queue manager 132. The queue manager 132 sends the names of the queues given by, for example, an administrator of the queues, to populate the dropdown list 504 through a web service. The service agent selects a queue from the dropdown list 504 and sends the queue selection to the queue manager 132 by clicking the submit button 508. The clear button 512 enables a service agent 108 to clear a previously submitted queue selection and choose another queue from the list of queues on the dropdown list 504.

The second portion of the screen, the expected wait time (EWT) 516, is for displaying the expected wait time of the selected queue that is sent from the queue manager 132 as a result of the queue selection submitted by the service agent 108. The expected wait time 516 is displayed in minutes and seconds. The screen 500 is shown with a date and time field 520 for displaying the date and time that the expected wait time 516 begins.

The third portion of the screen, ASAP Callback 524, includes a phone number field 524, a submit button 528 and a confirmation field 532. The phone number field 524 enables the service agent 108 to enter the phone number where the customer desires to receive a call-back. The service agent 108 clicks the submit button 528 and a web service transaction request is delivered to the queue manager 132 to put the customer in the selected queue. The confirmation field 532 displays a confirmation message stating that the customer is in the queue for a call-back. A call-back is confirmed upon receipt of the confirmation message from the queue manager 132. The confirmation message is sent to the system 100 through a web service confirmation transaction with the queue manager 132 and displayed on the screen 500 in the confirmation field 532.

The fourth portion of the screen, Schedule Appointment Callback 536, enables a service agent to access the schedule appointment call-back screen 550. The schedule appointment call-back screen 550 may be a pop-up screen or partial screen. In this embodiment, the schedule appointment call-back checkbox 538 is checked by a service agent 108 to access the schedule appointment call-back screen 550. The screen 500 further includes a toggle button 540 to minimize or maximize the schedule appointment call-back screen 550.

Referring to FIG. 5B, an exemplary graphical user interface including a schedule appointment call-back screen 550, for use with an embodiment of the management and queue interface system is shown. The schedule appointment call-back screen 550 appears when the service agent 108 checks the schedule appointment call-back checkbox 538. Following the checking of the schedule appointment call-back checkbox 538, the scheduled call back section expands and is displayed on the service agent's 108 screen. The schedule appointment call-back screen 550 includes a calendar field 544, date field 548, time field 552, phone number field 556, submit button 564 and cancel button 568. The appointment call-back screen 550 further includes an alternate date and time field 560, confirmation field 572 and cancel call-back button 576. The calendar field 544 graphically resembles a page on a calendar and enables the service agent 108 to select the desired appointment day on the field by mouse or other entry without manually typing the desired date and time for a call-back.

The steps for scheduling an appointment call-back include the service agent 108 selecting the date on the calendar field 544. The date will pre-populate the date in the date field 548. The date field 548 is modifiable and may be typed by a service agent 108. If the service agent 108 desires to manually enter a date and time for a scheduled call-back, the service agent 108 enters in the time that the customer wants to be called-back in the time field 552. The service agent 108 enters the phone number for receiving the call-back in the phone number field 556.

The service agent 108 selects the submit button 564 and a web service request transaction will be delivered to the queue manager 132. The queue manager 132 confirms whether the date and time selected by the service agent 108 is acceptable and validates the time, date and phone number information based on business rules from the business center associated with the queue manager 132. If all business rules are met and the date and time is available, a web services transaction confirmation is sent back to the system 100 confirming the call is scheduled and a confirmation message is displayed on the confirmation field 572. If the date and time of the appointment is not available, the queue manager 132 responds with some available dates and times for appointments. The queue manager 132 may send the closest available time slots in an attempt to meet the customers request.

Alternatively, the queue manager 132 may send the next four date and times that are available. The next four dates and times that are available are displayed on the screen 502 in the alternate date/time field 560. The service agent 108 confirms a new date and time with the customer from the available dates and times displayed in the alternate date/time field 560 and selects the chosen time on the on the alternate date/time field 560. If a service agent wants to clear the date 548, time 552 and phone number 556 fields, the cancel button 568 can be selected. The call-back is scheduled when the service agent 108 submits the web services request transaction again to validate the business rules. The service agent 108 may cancel the scheduled call-back by selecting the cancel call-back button 576. When the cancel call-back button 576 is selected, a web service request transaction with the queue manager 132 will cancel the scheduled call-back.

Referring now to FIG. 6, a flow chart of an exemplary method 600 for queuing voice calls for use by a resource or call recipient 108 with a call communication 128 system is shown. The method 600 includes the following five steps: receiving a communication (or call) from a customer 604, selecting a queue from a list of queues 608, viewing an expected wait time for the selected queue 612, providing to the customer the expected wait time for the selected queue 614, and providing two options to the customer, holding or a call-back 616.

In an embodiment, a service agent 108 performs the step of receiving a telephone call from a customer 604 and typically beginning a conversation. The step of selecting usually follows. The service agent 108, using information received from the customer, selects a queue from a list of queues 608.

The next step of method 600 typically involves the service agent 108 viewing an expected wait time for the selected queue 612 (displayed on an interface) and providing to the customer the expected wait time for the selected queue 614. In addition, the method 600 includes the service agent 108 providing two options to the customer, holding or a call-back 616. The hold option transfers the customer to the selected queue and the call-back option causes a call back. The service agent 108 or agent can use the system to direct a call to a specific queue. The directing system interacts with the call system and allows for a telephone call to be placed directly into an existing queue.

The call-back call option may include two variations, as soon as possible call-back and a scheduled call-back. The as soon as possible call-back sends a request for a call-back to a queue manager 132. The queue manager assigns a placeholder to the customer and places the placeholder in the appropriate queue. The call-back is initiated when the placeholder reaches the top of the queue.

Referring to FIG. 7, a flow chart of another exemplary method 700 for directing a communication for use with a call system 128 is shown. The method 700 is shown in nine steps. The steps include an automated resource 108 or a service agent 108 receiving a communication or call from a customer 704 and selecting, using information received from the customer, a queue from a list of queues 708 displayed on an interface for example an interface of a service agent workstation 136, for example. In one embodiment, the selected queue is a service agent queue. Queues for other employees may be used. The method 700 further includes the resource 108 or agent submitting the queue selection 712 to a queue manager 132.

The communications directing method 700 shown includes a service agent 108 viewing an expected wait time for the selected queue 716 displayed on an interface.

A resource 108 may perform the step of providing to the customer or caller the expected wait time for the selected queue 720. This information is typically provided to the customer or caller during a telephone conversation, but may be provided by other means such as electronically by automated voice text, email, internet etc. A customer or customer 104 uses the expected wait time in a queue information to decide whether to hold for the appropriate resource 108 or be placed in a queue for a call from the appropriate resource 108.

The method 700 further includes providing to the customer a choice of a hold option or a call-back option 724. This can be done by voice or electronically by text, e-mail etc.

If the customer chooses the hold option, the resource 108 transfers the communication to the selected queue 728 in the queue manager 132.

If the customer chooses the ASAP call option, which comprises placing a call to the customer after the expected wait time based upon the assigned placeholder in the queue 732, a request to add the customer to the queue is sent to the queue manager 132.

If the customer chooses, the scheduled call option, which includes the option to schedule a call to the customer at an appointed time chosen by the customer 734, a schedule appointment call-back component is caused to be displayed on a service agent workstation 136, for example or to the customers electronic device. An appointment time is chosen and scheduled with the queue manager 132.

The methods described including 600 and 700 for directing a communication or call may be embodied on a computer-readable medium as instructions executable by a computer.

In an embodiment, a computer-readable medium embodying instructions executable by a computer for directing a communication for use in a call system 128 with queues, includes a queue selector 116 for generating a list of queues. The queue selector is a service agent queue and a service agent selects, from the information given by a customer, a desired queue from a list of queues displayed on the interface. Further, the computer-readable medium includes an expected wait time component 120 to indicate an expected wait time for the selected queue and a call options selector 124. The call options selector 116 provides a choice of a hold option or a call option for selection. The remainder of the method steps may also be placed on a computer readable medium.

The systems and methods described can be used in conjunction with one or more ACDs, IVRs, and other automated and computerized mechanisms.

It should also be appreciated that many of the elements discussed in this specification may be implemented in a hardware circuit(s), a processor executing software code which is encoded within computer readable media accessible to the processor, or a combination of a hardware circuit(s) and a processor or control block of an integrated circuit executing machine readable code encoded within a computer readable media. As such, the term circuit, module, server, or other equivalent description of an element as used throughout this specification is intended to encompass a hardware circuit (whether discrete elements or an integrated circuit block), a processor or control block executing code encoded in a computer readable media, or a combination of a hardware circuit(s) and a processor and/or control block executing such code.

The invention claimed is:

1. A queue interface system for queuing voice calls for use with a communication system having queues, the system comprising:
a queue selector, wherein a queue is selected from a list of queues on a display and one or more of the queues on the list of queues is a service agent queue, including a prioritization of queue list routine, wherein the prioritization of queue list routine prioritizes one or more of the displayed queues using a score by determining data elements available for a customer or call to be scored, assigning a point value and weight value for a set of available data elements, and scoring each data element in the set by multiplying the point value by the weight value;
an expected wait time component displaying an expected wait time of a customer for the selected queue; and
a call options selector wherein at least one of a hold option and a call option is available for directing a call, wherein the hold option places a call in the selected queue and the call option comprises assigning a placeholder for the customer in the selected queue and causing a call to the customer to occur when the assigned placeholder reaches a position at or close to the top position in the selected queue.

2. A computer-readable medium embodying instructions executable by a computer for queuing voice calls for use with a communication system having queues, comprising:
a queue selector for generating a list of queues, wherein a service agent selects, using information provided by a customer, a desired queue from a list of queues displayed on an interface;
a prioritization of queue list routine, wherein the prioritization of queue list routine prioritizes one or more of the displayed queues using a score by determining data elements available for a customer or call to be scored, assigning a point value and weight value for each available data element, and scoring each available data element by multiplying the point value by the weight value;
an expected wait time component to indicate an expected wait time for the selected queue; and
a call options selector wherein at least one of a hold option and a call option is available for selection, wherein the hold option comprises transferring a call to the selected queue and the call option comprises assigning a placeholder for the customer in the selected queue and causing a call to the customer to occur when the assigned placeholder reaches a position at or close to the top position in the selected queue.

3. A method for queuing voice calls for use with a communication system having a service agent, a display and queues, the method comprising:
receiving a call from a customer;
selecting, using information received from the customer, a queue from a list of queues displayed on an interface, wherein the selected queue is a service agent queue, wherein the list of queues is prioritized;
determining data available for a customer or call to be scored;
assigning a point value for each available data element;
assigning a weight value for each available data element;
scoring each available data element by multiplying the point value by the weight value of each data element; and
determining a priority for one or more queues using the scores
viewing an expected wait time for the selected queue displayed on the interface;
providing to the customer the expected wait time in the selected queue;
providing to the customer a choice of at least one of a hold option and a call option, wherein the hold option transfers the customer to the selected queue and the call option comprises assigning a placeholder for the customer in the selected queue and causing a call to the customer to occur when the assigned placeholder reaches a position at or close to the top position in the selected queue.

4. The system of claim 1, wherein the call option further comprises assigning a placeholder for a customer in the selected queue and causing a call to the customer to occur after the expected wait time and wherein the expected wait time is determined based upon the assigned placeholder in the selected queue.

5. The system of claim 1, wherein the call option further comprises an option to schedule a call to a customer at an appointed time chosen by the customer.

6. The system of claim 1, wherein the hold option is only available in response to an incoming voice call.

7. The system of claim 1, wherein the queue selector comprises:
a queue display routine wherein a list of queues corresponding to queues in a queue manager is displayed; and
a queue selection routine wherein an indication of the selected queue is sent to the queue manager.

8. The system of claim 7, wherein the queue display routine displays the list of queues on a display that is viewed by a customer.

9. The system of claim 7, wherein the queue display routine displays the list of queues on a display that is viewed by a service agent.

10. The system of claim 1, wherein the expected wait time component comprises:
a receive routine receiving the expected wait time for the selected queue from a queue manager; and
a display routine displaying the expected wait time.

11. The system of claim 1, wherein the call options selector comprises:
an input routine receiving a selected option for queuing from a service agent;
a transfer call routine placing a call in the selected queue;
a call routine assigning a placeholder for a customer in the selected queue and placing a call after a wait time based upon the assigned placeholder in the selected queue; and
a scheduled call routine scheduling a call to the customer at a date and time chosen by the customer.

12. The computer readable medium of claim 2, wherein the call options selector comprises an option to place a call to the customer after the expected wait time and wherein the expected wait time is determined based upon the assigned placeholder in the selected queue.

13. The computer readable medium of claim 2, wherein the call options selector comprises an option to schedule a call to the customer at a date and time chosen by the customer.

14. The computer readable medium of claim 13, wherein the schedule call option further comprises:
a scheduling component displayed on a display receiving a call time and date selection, wherein the scheduling component sends the call time and date selection to a queue manager, receives a confirmation message from the queue manager, and displays the confirmation message.

15. The computer readable medium of claim 2, wherein the queue selector displays a list of queues corresponding to queues in a queue manager, and sends the selection of a selected queue to the queue manager.

16. The computer readable medium of claim 2, wherein the queue selector displays the list of queues on a display that is viewed by one of a customer or a service agent.

17. The computer readable medium of claim 2, wherein the expected wait time component receives the expected wait time for the selected queue from a queue manager through a network, and displays the expected wait time of a customer for the selected queue.

18. The computer readable medium of claim 2, wherein the call option further comprises:
a call confirmation message from the queue manager displayed on a screen.

19. The method of claim 3, wherein the call option further comprises an option to place a call to the customer after the expected wait time and wherein the expected wait time is determined based upon the assigned placeholder in the queue.

20. The method of claim 19, wherein the call option further comprises:
sending a request for a call to a queue manager;
receiving a confirmation message from the queue manager; and
displaying the confirmation message.

21. The method of claim 3, wherein the call option further comprises an option to schedule a call to the customer at an appointed time chosen by the customer.

22. The method of claim 3, further comprising:
displaying a list of queues corresponding to queues in a queue manager; and
sending the selection of a desired queue to the queue manager.

23. The method of claim 3, wherein the list of queues is displayed on an interface that is viewable by the customer.

24. The method of claim 3, further comprising:
receiving the expected wait time for the selected queue from a queue manager; and
displaying the expected wait time of a customer for the selected queue.

25. The method of claim 3, wherein the schedule call option further comprises:
displaying an appointment scheduling component;
receiving a call back time and date selection;
sending the call back time and date selection to a queue manager;
receiving a confirmation message from the queue manager; and
displaying the confirmation message.

* * * * *